(12) United States Patent
Athalye

(10) Patent No.: US 7,113,790 B2
(45) Date of Patent: Sep. 26, 2006

(54) METHOD AND APPARATUS FOR USING A TRAFFIC CHANNEL FOR COMMUNICATIONS OF CONTROL DATA IN A WIRELESS COMMUNICATION SYSTEM

(75) Inventor: Sanjeev Arvind Athalye, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 447 days.

(21) Appl. No.: 10/368,684

(22) Filed: Feb. 18, 2003

(65) Prior Publication Data

US 2004/0162031 A1    Aug. 19, 2004

(51) Int. Cl.
*H04Q 7/20*    (2006.01)
(52) U.S. Cl. ............... 455/450; 455/511; 455/451; 455/464; 455/512
(58) Field of Classification Search ........... 455/450, 455/511, 451, 464, 452.2, 512, 513, 514, 455/515, 516; 370/522
See application file for complete search history.

(56) References Cited

U.S. PATENT DOCUMENTS

| | | | | |
|---|---|---|---|---|
| 5,235,598 | A | * | 8/1993 | Sasuta ..................... 370/327 |
| 5,239,678 | A | * | 8/1993 | Grube et al. .............. 455/511 |
| 5,926,755 | A | | 7/1999 | Ghisler .................... 455/414 |
| 6,055,437 | A | * | 4/2000 | Riley et al. ............... 455/511 |
| 6,904,012 | B1 | * | 6/2005 | Kim et al. ................. 370/209 |
| 2005/0153654 | A1 | * | 7/2005 | Anderson et al. .......... 455/12.1 |

FOREIGN PATENT DOCUMENTS

WO    0001173    1/2000

OTHER PUBLICATIONS

"Medium Access Control (MAC) Standard for cdma2000 Spread Spectrum Systems" TIA/EIA Interim Standard, TIA/EIA/IS-2000-3, XP-002302729, pp. 1-180, Aug. 1999.

\* cited by examiner

*Primary Examiner*—Matthew Anderson
*Assistant Examiner*—Minh Dao
(74) *Attorney, Agent, or Firm*—Philip R. Wadsworth; Thien Nguyen; Sayed Hossain Beladi

(57) ABSTRACT

Various method and apparatus provides for a method and apparatus for a communication system to efficiently use the traffic channel resources for communications of control data. A controller receiving a transmission indicator of a control message for transmission from a base station to a mobile station over a traffic channel. The controller selects a traffic channel dormant timer based on the transmission indicator. A network entity may send the transmission indicator to the base station. The transmission indicator of the control message is determined based on at least one of extent of communications and size of data of the control message between the mobile station and the base station. The controller sets up a traffic channel for transmission of the control message with the selected traffic channel dormant timer. The traffic channel is torn down after expiration of the selected traffic channel dormant timer.

2 Claims, 3 Drawing Sheets

METHOD AND APPARATUS FOR USING A TRAFFIC CHANNEL FOR COMMUNICATIONS OF CONTROL DATA IN A WIRELESS COMMUNICATION SYSTEM

FIELD

The present invention relates generally to the field of communications, and more particularly, to wireless communications.

BACKGROUND

A system of protocols normally controls the ways a mobile station and a base station may operate in a communication system. Such protocols are disclosed in a set of standards published by a recognized standard body. The protocols may define a set of channels, such as traffic channels for communication of user data and control channels for communications of control data. The control channels may be shared among users, and normally are used for a short period of time. In general, control data are from one bit of data to several bytes of data. The transmission of control data for a mobile station is very short in duration. Moreover, the duration between transmission and reception of a reply to a control message is short in comparison to a typical traffic data communication. The traffic data are large in comparison to the control data. As a result, the traffic channels assigned to a mobile station are maintained for a while. The traffic data transmission may also be in a discontinuous manner. As such, the traffic channels are maintained as long as there is a possibility of transmitting traffic channel data. If the traffic channel is not used after a dormant period of time, the traffic channel is torn down.

In certain cases, where the size of control data is too large to be transmitted over a control channel, a traffic channel may be set up to transmit the control data to a specific mobile station. However, when the traffic channel is set up for transmission of control data, the channel may not be torn down for a while, resulting in inefficient use of traffic channel resources. Therefore, there is a need for using a traffic channel for communications of control data in a wireless communication system very efficiently.

SUMMARY

Various method and apparatus provides for a method and apparatus for a communication system to efficiently use the traffic channel resources for communications of control data. A controller receives a transmission indicator of a control message for transmission from a base station to a mobile station over a traffic channel. The controller selects a traffic channel dormant timer based on the transmission indicator. A network entity may send the transmission indicator to the base station. The transmission indicator of the control message is determined based on at least one of extent of communications and size of data of the control message between the mobile station and the base station. The controller sets up a traffic channel for transmission of the control message with the selected traffic channel dormant timer. The traffic channel is torn down after expiration of the selected traffic channel dormant timer.

BRIEF DESCRIPTION OF THE DRAWINGS

The features, objects, and advantages of the present invention will become more apparent from the detailed description set forth below when taken in conjunction with the drawings in which like reference characters identify correspondingly throughout and wherein.

DETAILED DESCRIPTION OF THE PREFERRED EMBODIMENT(S)

Generally stated, various aspects of the invention provide for efficient use of communication resources in a communication system by using a variable size traffic channel dormant timer for communications of control data over a traffic channel. One or more exemplary embodiments described herein are set forth in the context of a digital wireless data communication system. While use within this context is advantageous, different embodiments of the invention may be incorporated in different environments or configurations. In general, the various systems described herein may be formed using software-controlled processors, integrated circuits, or discrete logic. The data, instructions, commands, information, signals, symbols, and chips that may be referenced throughout the application are advantageously represented by voltages, currents, electromagnetic waves, magnetic fields or particles, optical fields or particles, or a combination thereof. In addition, the blocks shown in each block diagram may represent hardware or method steps.

More specifically, various embodiments of the invention may be incorporated in a wireless communication system operating in accordance with a communication standard outlined and disclosed in various standards published by the Telecommunication Industry Association (TIA) and other standards organizations. Such standards include the TIA/EIA-95 standard, TIA/EIA-IS-2000 standard, IMT-2000 standard, UMTS and WCDMA standard, GSM standard, all incorporated by reference herein. A copy of the standards may be obtained by writing to TIA, Standards and Technology Department, 2500 Wilson Boulevard, Arlington, Va. 22201, United States of America. The standard generally identified as UMTS standard, incorporated by reference herein, may be obtained by contacting 3GPP Support Office, 650 Route des Lucioles-Sophia Antipolis, Valbonne-France.

Figure 1:
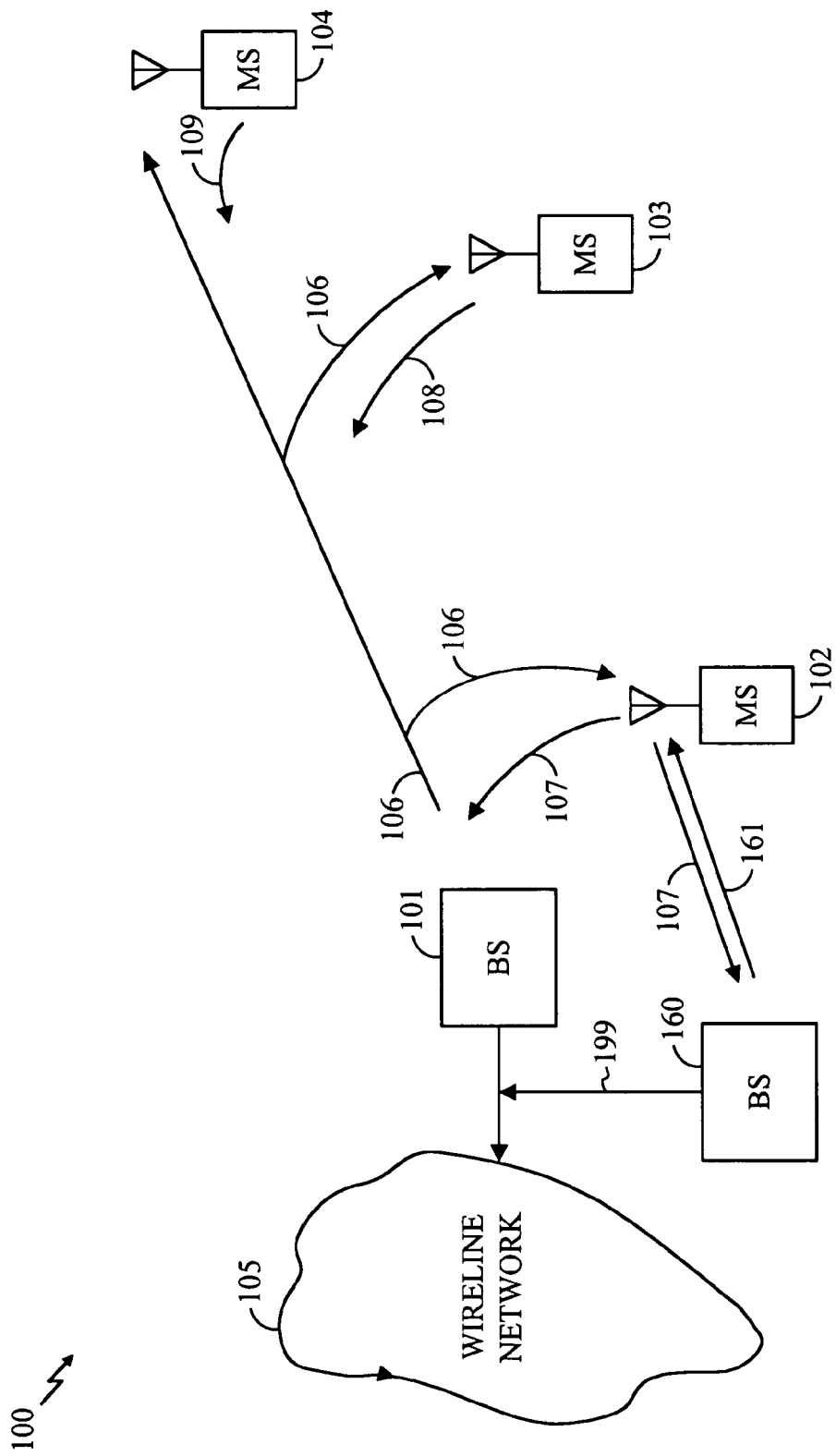
FIG. 1 illustrates a communication system capable of operating in accordance with various embodiments of the invention.

FIG. 1 illustrates a general block diagram of a communication system 100 capable of operating in accordance with any of the code division multiple access (CDMA) communication system standards and GSM standard while incorporating various embodiments of the invention. Communication system 100 may be for communications of data, or data and voice. Generally, communication system 100 includes a base station 101 that provides communication links between a number of mobile stations, such as mobile stations 102–104, and between the mobile stations 102–104 and a public switch telephone and data network 105. Base station 101 may include a number of components, such as a base station controller and a base transceiver system. For simplicity, such components are not shown.

Base station 101 may be in communication with other base stations, for example base station 160. A mobile switching center (not shown) may control various operating aspects of the communication system 100 and in relation to communications over a back-haul 199 between network 105 and base stations 101 and 160. Base station 101 communicates with each mobile station that is in its coverage area via a forward link signal transmitted from base station 101. The forward link signals targeted for mobile stations 102–104 may be summed to form a forward link signal 106. Each of the mobile stations 102–104 receiving forward link signal 106 decodes the forward link signal 106 to extract the received information. Base station 160 may also communicate with the mobile stations that are in its coverage area via a forward link signal transmitted from base station 160. Mobile stations 102–104 communicate with base stations 101 and 160 via corresponding reverse links. Each reverse link is maintained by a reverse link signal, such as reverse link signals 107–109 for mobile stations 102–104, respectively. The reverse link signals 107–109, although may be targeted for one base station, may be received at other base stations. Various aspects of the invention provide for the mobile stations and the base stations in communication system 100 to use a variable size traffic channel dormant timer for communications of control and traffic data over a traffic channel.

Base stations 101 and 160 may be simultaneously communicating to a common mobile station. For example, mobile station 102 may be in close proximity of base stations 101 and 160, which can maintain communications with both base stations 101 and 160. On the forward link, base station 101 transmits on forward link signal 106, and base station 160 on the forward link signal 161. On the reverse link, mobile station 102 transmits on reverse link signal 107 to be received by both base stations 101 and 160. For transmitting a packet of data to mobile station 102, one of the base stations 101 and 160 may be selected to transmit the packet of data to mobile station 102. On the reverse link, both base stations 101 and 160 may attempt to decode the traffic data transmission from the mobile station 102. The data rate and power level of the reverse and forward links may be maintained in accordance with the channel condition between the base station and the mobile station.

Referring to FIG. 1, the wireline network 101 may include an Internet Protocol (IP) based network. A packet data serving node (PDSN) may be between the backhaul 199 and the IP network for controlling and routing the packet data between the base stations and the IP network. The base station controller (not shown) may also have a packet data control function (PCF) that controls communications of packet data between the PDSN and a number of base stations in the communication system. The PDSN often generates control information for the mobile stations in the communication system 100. Such control information may be specific for a mobile station. For example, PDSN may send an Echo Request message to a mobile station to determine if the mobile station is still in the coverage area. The response may be an Echo response message from the mobile station. The Echo request and response messages are very short in duration. In another case the PDSN may receive control data from the IP network that may need to go over a traffic channel because of its size. For example, the IP network may send a mobile IP registration reply to a mobile station in response to a request from the mobile station. The reply message is for an intended mobile station, and the reply message may be short in comparison to traffic data that are generally communicated over traffic channels. In any of these cases, the PDSN may generate a transmission indicator for the base station to use a smaller size traffic channel dormant timer when a traffic channel is set for transmission and the reception of such control messages, in accordance with various aspects of the invention. The transmission indicator may also indicate a preferred duration that may be selected from a number of possible dormant timer periods. As such, the traffic channel dormant timer may be a variable size parameter.

The base station may select a short traffic channel dormant timer, in comparison to a dormant timer used for communication of traffic data, for tearing down the traffic channel that is set up for transmission of control data, in accordance with an embodiment of the invention. In absence of such an indication from PDSN or other processing units, the base station may use a normal traffic channel dormant timer for tearing down the traffic channel. Consequently, the base station does not hold a traffic channel for a long time when transmitting control data. The base station may have several discrete traffic channel dormant timers. Based on the nature of the control message, the base station may select an appropriate value of traffic channel dormant timer from the predefined traffic channel dormant timers. In an alternative, the base station may use a continuously variable size traffic channel dormant timer that changes bases on the nature of the control data messages. The nature of the control message may be indicated by the transmission indicator from the PDSN. The nature of control message may be determined based on the extent (duration) of the communications required for completion of the control messages. For example, the Echo request and response messages are very short in duration. As such, the transmission indicator provide for the dormant timer to be set to a low value. In another example, the IP registration reply control messages may require some delay between the communications between the base station and the mobile station. In such a case, the transmission indicator provide for the dormant timer to be set to a higher value.

Figure 2:
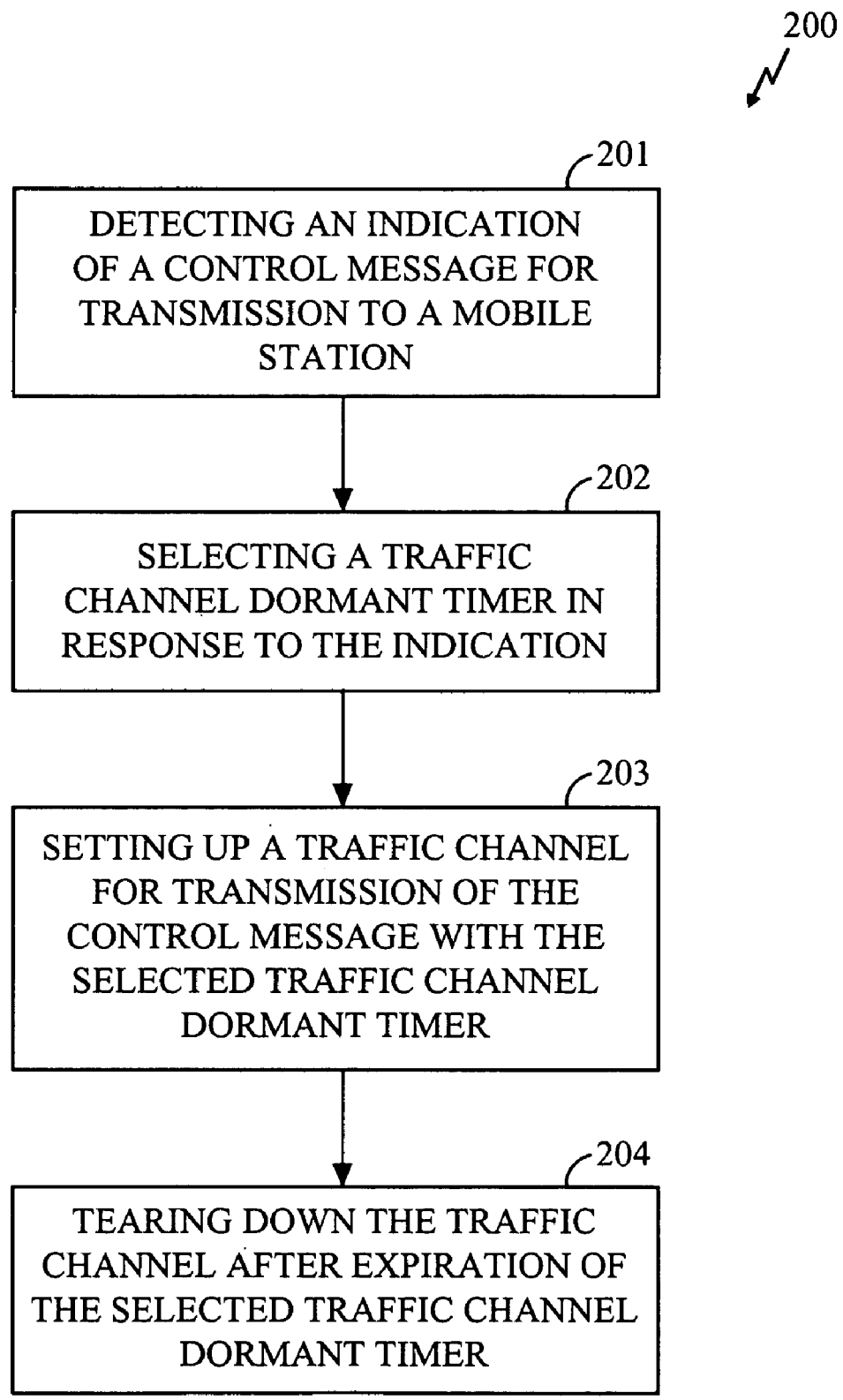
FIG. 2 is a flow chart of various steps that may be performed by a base station for communications of control data using variable size traffic channel dormant timer in accordance with various aspects of the invention.

Referring to FIG. 2, a flow chart 200 depicts various steps that may be performed by a processor/controller in the base stations shown in FIG. 1 for selecting a traffic channel dormant timer for each traffic channel being set up with the mobile stations in the communication system 100. At step 201, the base station may detect an indication of a control message for transmission to a mobile station. The control data may need to be communicated to a specific mobile station. The indication may be in the form of a signaling between the base station and the packet data controller connected to the PDSN, or any alternative form. The transmission indicator indicates the nature of the control message and may be determined based on the extent (duration) and the amount of data of the communications required for completion of the control messages. At step 202, the base station may select a traffic channel dormant timer in response to receiving the indication. The dormant timer may be selected from a set of dormant timers having different duration values. For example, a very short timer value may be selected for a control data that requires communications of a small amount of data, and a long timer value may be used for control messages that require communications of a large amount of data. In another aspect, the dormant timer may be selected based on an expected delay time between transmission and reception of messages (i.e. a total duration of such communications) between the base station and the mobile station. At step 203, the base station may set up a traffic channel for the transmission of the control data to a specific mobile station while setting the traffic channel dormant timer to the selected dormant timer. At step 204, the traffic channel is torn down after the expiration of the selected dormant timer. In most cases, the selected dormant timer for communications of control data is much smaller than a dormant timer selected for communications of traffic data to the same mobile station. As such, the communication resources allocated to traffic channels are used very efficiently by preventing hold up of a traffic channel for a long period of time when the traffic channel is used for communications of control data.

Figure 3:
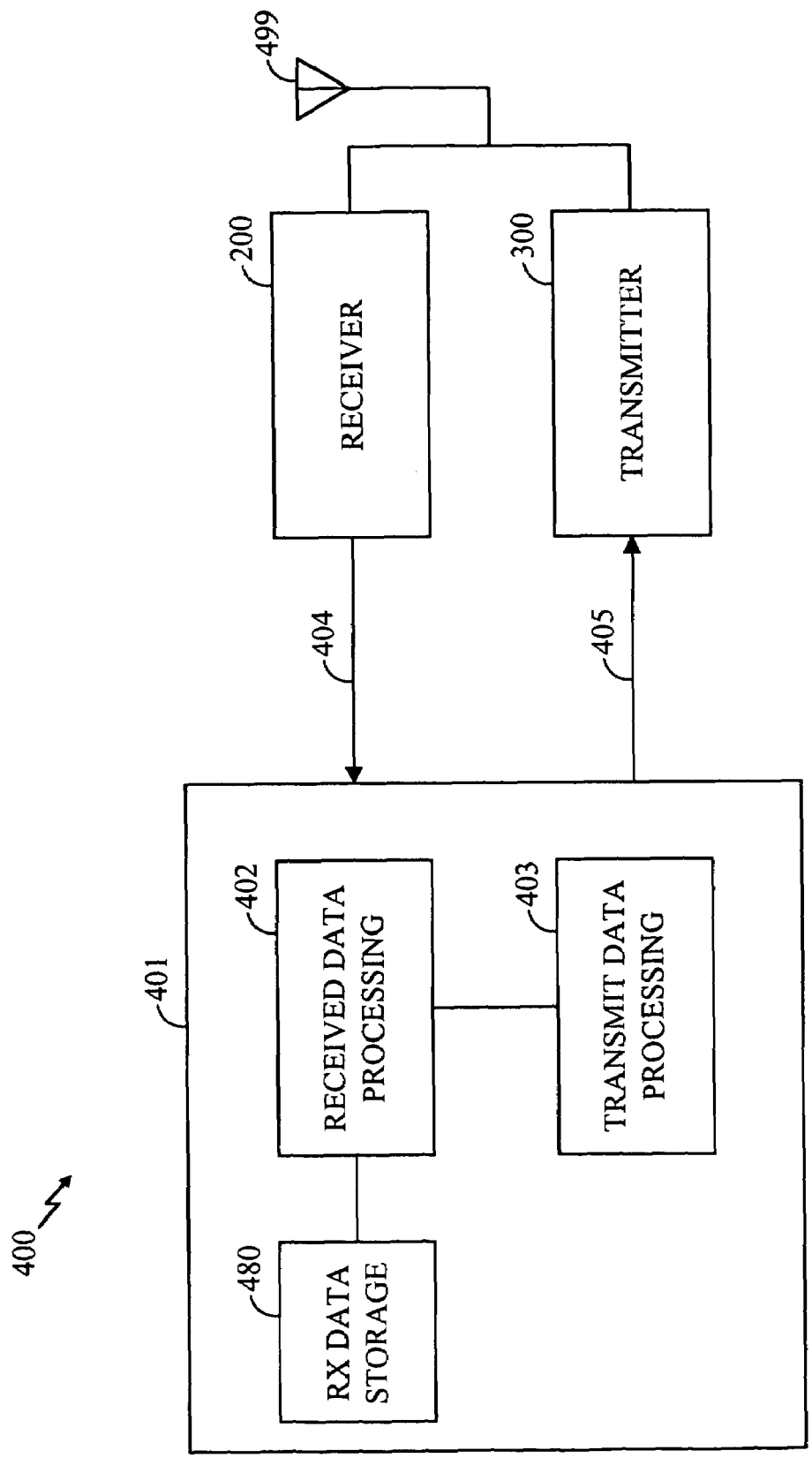
FIG. 3 illustrates a communication system transceiver capable of operating in accordance with various embodiments of the invention.

FIG. 3 depicts a general diagram of a transceiver system 400 for incorporating a receiver 200 and a transmitter 300 for maintaining a communication link with a destination while operating in accordance with various aspects of the invention. The transceiver 400 may be incorporated in a base station shown in FIG. 1. The transceiver 400 may be used for communications of traffic and control data. The communications may be over a traffic channel. The transceiver 400 may also be incorporated in a mobile station. A processor 401 may be coupled to receiver 200 and transmitter 300 to process the received and transmitted data and control various aspects of the receiver 200 and transmitter 300. Various aspects of the receiver 200 and transmitter 300 may be common, even though receiver 200 and transmitter 300 are shown separately. In one aspect, receiver 200 and transmitter 300 may share a common local oscillator and a common antenna system 499 for RF/IF receiving and transmitting. Transmitter 300 receives the data for transmission on input 405. Transmit data processing block 403 prepares the data for transmission on a transmit channel. Received data, after being decoded, are received at processor 401 at an input 404. Received data are processed in received data processing block 402 in processor 401. Various operations of processor 401 may be integrated in a single or multiple processing units. The transceiver 400 may be connected to another device. The transceiver 400 may be an integral part of the device. The device may be a computer or operates similar to a computer. The device may be connected to a data network, such as Internet. In case of incorporating the transceiver 400 in a base station, the base station through several connections may be connected to network 105. The connections may include a PDSN.

At the transmitter 300, in accordance With various aspects of the invention, processor 401 sets a traffic channel dormant timer in accordance with the transmission indicator received from the PDSN or any other processing entity indicating the nature of the transmission. A memory unit in processor 401 may store a number of dormant timer values that corresponds to a number of different transmission indicators which are generated based on the nature of the communications of the control data over a traffic channel. The transmit data processing unit 403 may determine the duration of the dormant timer based on the received transmission indicator. A short timer may be selected for communications of control data that require short duration and a long dormant timer for communications that take a longer time. In one case, there may be more data or longer delay between the transmissions and reception of data between the base station and the mobile station. The processing of the received data generally includes checking for error in the received packets of data. The receive data storage block 480 may accumulate data received in each frame of data to reconstruct the entire block of data. If the received data is not reconstructed based on the received frames of data and the dormant timer is expired, the processor 401, in connection with received processing unit 402 and transmit processing unit 403, may tear down the traffic channel after the expiration of the dormant timer.

Those of skill in the art would further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

The previous description of the preferred embodiments is provided to enable any person skilled in the art to make or use the present invention. The various modifications to these embodiments will be readily apparent to those skilled in the art, and the generic principles defined herein may be applied to other embodiments without the use of the inventive faculty. Thus, the present invention is not intended to be limited to the embodiments shown herein but is to be accorded the widest scope consistent with the principles and novel features disclosed herein.

What is claimed is:

1. A method for a cmmunication system, comprising:
   detecting a transmission indicator of a control message for transmission from a base station to a mobile station over a traffic channel;
   selecting a traffic channel dormant timer based on said transmission indicator;
   sending said transmission indicator to said base station;
   determining said transmission indicator of said control message based on at least one of extent of communications and size of data of said control message between said mobile station and said base station;
   setting up a traffic channel for transmission of said control message with said selected traffic channel dormant timer.

2. An apparatus for a communication system, comprising:

means for detecting a transmission indicator of a control message for transmission from a base station to a mobile station over a traffic channel;

means for selecting a traffic channel dormant timer based on said transmission indicator;

means for sending said transmission indicator to said base station;

means for determining said transmission indicator of said control message based on at least one of extent of communications and size of data of said control message between said mobile station and said base station;

means for setting up a traffic channel for transmission of said control message with said selected traffic channel dormant timer.

* * * * *